United States Patent
Holland et al.

(10) Patent No.: US 6,929,265 B2
(45) Date of Patent: Aug. 16, 2005

(54) MOISTURE SEAL FOR AN F-TYPE CONNECTOR

(76) Inventors: Michael Holland, 107 Via Del Cielo, Santa Barbara, CA (US) 93109; Yeh Min-Hua, No, 16 Lane 106, Sec.3, Ming-Chuan East Road, Taipei (TW)

( * ) Notice: Subject to any disclaimer, the term of this patent is extended or adjusted under 35 U.S.C. 154(b) by 46 days.

(21) Appl. No.: 10/456,350

(22) Filed: Jun. 6, 2003

(65) Prior Publication Data

US 2004/0245730 A1 Dec. 9, 2004

(51) Int. Cl.⁷ .......................... H02G 15/04; H01R 13/52
(52) U.S. Cl. .................. 277/622; 439/273; 439/277; 174/65 SS
(58) Field of Search .................. 277/622; 439/578, 439/592, 587, 273, 277; 285/343; 174/65 SS; 74/65 SS

(56) References Cited

U.S. PATENT DOCUMENTS

| | | | | |
|---|---|---|---|---|
| 2,477,969 A | * | 8/1949 | Donner | 277/607 |
| 2,837,353 A | * | 6/1958 | Ashbrook | 285/106 |
| 2,941,025 A | * | 6/1960 | Wayman | 174/65 SS |
| RE25,047 E | * | 10/1961 | Risley | 285/48 |
| 4,375,011 A | * | 2/1983 | Grunau | 174/65 SS |
| 4,583,811 A | * | 4/1986 | McMills | 439/584 |
| 4,692,563 A | * | 9/1987 | Lackinger | 174/65 SS |
| 5,114,190 A | * | 5/1992 | Chalmers | 285/53 |
| 5,321,205 A | * | 6/1994 | Bawa et al. | 174/65 SS |
| 5,857,865 A | * | 1/1999 | Shimirak et al. | 439/277 |
| 6,716,062 B1 | * | 4/2004 | Palinkas et al. | 439/578 |

* cited by examiner

*Primary Examiner*—Alison K. Pickard
(74) *Attorney, Agent, or Firm*—Michael G. Petit

(57) ABSTRACT

The invention provides a method for moisture sealing the interface between a nut on the leading end of a male F-Type connector and the threaded tubular shaft of the female F connector. The male connector is attached to a coaxial cable and the female is mounted to an outdoor device such as a cable TV splitter, grounding device, satellite dish, or distribution device, amplifier or group. The sealing device includes a compressible portion comprising an elastically compressible member having a cylindrical bore and a conical outer surface. An annular compression ring overlies a portion of the conical outer surface of the compressible portion. The compressible portion is compressed radially inwardly against the shaft of the female F-Type connector as the leading edge of the male F nut is screwed onto the female threaded shaft of the female F-Type connector, providing a pressurized moisture ingress barrier. The compressible portion may have internal 3/8-32 threads to mate with threads on the shaft for a more secure seal.

4 Claims, 4 Drawing Sheets

MOISTURE SEAL FOR AN F-TYPE CONNECTOR

BACKGROUND OF THE INVENTION

1. Field of the Invention

The present invention relates to a moisture seal for an F-Type coaxial cable connector.

2. Prior Art

It has been found that the most common reason for degraded TV signals in systems employing outdoor cable or satellite TV cables and/or connections is the ingress of moisture into the coaxial cable through the end connectors. The ingress of moisture into the coaxial cable is primarily due to the pressure changes in small air pockets disposed within the cable during daily and seasonal temperature changes. As the ambient temperature decreases, moist air drawn into the end of the coaxial cable, the moisture eventually corroding the internal shield of the cable. It has therefore become very important to seal the F connectors to the cable and the interconnections between connector and device when used outdoors.

The F connector-to-coaxial cable, and F male-to-female connector interface have four places moisture may enter the interconnection. The points of moisture entry are the interface between: (a) the trailing end of the male connector and the cable; (b) the connector shell and the connector body; (c) the swivel nut and the connector body; and (d) the swivel nut and the F-Type female connector on the device being connected. The foregoing principal sites of water vapor ingress are illustrated in FIG. 6.

Recent advances have been made for connector designs which have effectively sealed the first three moisture ingress locations mentioned above. It is leakage through the last interface (i.e., the interface between the swivel nut on the male F-Type connector and the female F-Type connector on the device being connected) that persists in the art. In accordance with the prior art, the leading end of the internally threaded nut on the male F-Type connector (F connector), which is attached to the cable, is screwed on to the female F connector which has a mating outside thread. The integrity of the interface between the male and female F connectors controls the mechanical and electrical performance of the connection. The thread used on F connectors is a course ⅜-32, specified by the SCTE (Society of Cable Television Engineers) and the EIA (Electronics Industry Association). It is well known that a metal threaded interface of this type cannot be relied upon to restrict the flow of moisture-laden air to the level needed to resist the ingress of such air into the cable over a period of many years exposure. Accordingly, there is a need for a universal sealing device which can protect the interface between the male connector nut and the female shaft from moisture ingress that is operable with the variety of different male connector types available and the variety of female connectors (on devices) with varying lengths, finishes, and bulkheads.

There are presently a few devices and methods used to prevent the ingress of moist air at the male nut-F female interface as illustrated in FIGS. 1–4. These devices only work in selected applications. None of the prior art devices provide an adequate seal between the nut on a male F connector and the threaded shaft of a female F connector which has threads coextensive with the length of the shaft. With reference to FIG. 1, a rubber boot 10 is employed in accordance with the prior art to form a seal between a cable 11 and a ridge 12 that sometime exists on the female F connector 13 mounted on the device 14 being connected to. The rubber boot 10 may keep out some moisture but does not provide a seal that is tight. Further, the device relies on the presence of a sealing ridge 12 on the female connector which is usually absent.

With reference to FIG. 4, air shrink tubing 40 is also employed in the art to provide a seal between the cable 11 and the F-connector 13. Heat shrink tubing cannot be used because the PVC on the coaxial cable jacket will melt. The air shrink tubing 40 presents an inwardly-directed (radial) sealing force but requires a minimal length of the female F connector shaft to be exposed in order to provide a water seal. In addition, the shaft must have a smooth surface. The tubing will not shrink into the threads of the female connector. Therefore this method has a limited application; being operable only for a female F connector having a smooth, unthreaded outer surface on the shaft thereof.

Another sealing technique, though not widely used, is to fill the male connector nut with a silicone grease prior to attachment of the nut to the shaft of the female F connector which will fill the area between threads. This is not recommended due to the difficulty in applying the correct amount of grease as well as the problem of removal and hand cleaning.

The axial compression port seal 20, illustrated in FIGS. 2 and 3, is the most effective sealing device and method employed in the current art. The axial compression port seal 20 consists of a tubular elastic member that slides overt the shaft 21 of the female F connector. When axial pressure from tightening the male nut 22 compresses the elastic device 20, the opposing end of the device 21 exerts an equal force on a bulkhead 23 and thus seals both sides as it compresses. This device 20 and method works well if all sizes are exactly correct for the length of the shaft 21. In practice, with many products being used, this method becomes ineffective. In addition, the axial compression port seal 20 relies on the axial force it exerts on a bulkhead in order to provide a seal. In many devices, this bulkhead does not exist. When an axial compression port seal 20 is used over threads, it cannot exert the needed inward radial force to fill and occlude the thread and pressure seal from its own elasticity. The radial sealing ability of axial compression port seals 20 has been limited due to the need for the installer to slide it over the cylindrical shaft of the female F connector with little effort.

In summary, due to the variety of female connector port lengths, finishes, thread lengths, and the lack of clean, machined bulkheads for axial compression that are currently available on devices being used, it has been almost impossible to achieve moisture ingress protection. Even when a machined bulkhead is available for an axial compression seal, the seal must be sized for the exact length of the female port and male nut so that the proper axial force can be achieved when the male connector is fully screwed in. These three components may be sized correctly to resist moisture ingress for one set of products, but the non-standardization of device dimensions used in the field make these four variables: male nut depth; female shaft length; machined flat bulkhead; and axial rubber seal length combination improbable to find in any particular installation. Therefore, there is a need for a universal port seal that will not require a device to have a proper bulkhead as an abutting end for an axial rubber seal, or extensive non-threaded F-Type female shaft with no cast parting lines as is required for a shrink tube moisture seal.

SUMMARY

It is an object of the present invention to provide a sealing device and a method for using the device for sealing a space between a male and female F-Type connector that does not require the presence of a bulkhead on the female connector.

It is a further object of the invention to provide a sealing device meeting the above objective and does not require the female F-Type connector to have an unthreaded shaft portion in order to insure sealing.

The above objectives are met by the provision of a radial compression seal for an F-type coaxial cable connector operable for preventing moisture from entering an interface between a threaded nut on a male F connector and a threaded shaft on a female F connector, the threaded shaft having a leading end, a trailing end and a shaft length therebetween and a shaft diameter. The radial compression seal comprises essentially an elastic sealing member and a compression ring slidably mounted over the elastic sealing member. The elastic sealing member comprises a tubular ring of an elastically compressible material having a conical outer surface tapering outwardly from a leading end thereof to a trailing end thereof, and an axial bore having a bore diameter substantially equal to the shaft diameter. The inelastic compression ring has a cylindrical axial bore in a leading end thereof and a conical axial bore in a trailing end thereof. The conical axial bore tapers outwardly toward the leading end of the compression ring. The compression ring is slidingly mounted over the trailing end of the conical outer surface of the elastic sealing member. When said elastic sealing member is disposed on the the shaft adjacent the leading end thereof and the compression ring is forced to move in an axial direction toward the trailing end of the elastic sealing member by the advancement of a nut on a male F connector urged against the trailing end of the compression ring, the compression ring compresses the underlying elastic sealing member radially inwardly against said shaft thereby providing a seal between the shaft and the nut.

The elastic sealing member preferably has an annular groove on the conical outer surface near the trailing end thereof, and the compression ring preferably has an annular ridge within the axial bore adjacent the leading end thereof. The annular ridge matingly engages the annular groove when the leading end of the compression ring is advanced over the trailing end of the elastic sealing member thereby holding the sealing member and compression ring in juxtaposition prior to, and during placement of the seal on the shaft of the female F connector. The cylindrical axial bore of the elastic sealing member is preferably threaded.

The radial compression preferably is provided in an assembly which includes the elastic sealing member, a compression ring and an insertion cap. The insertion cap is employed to facilitate the placement of the elastic sealing member and the compression ring on the shaft of the female F connector in preparation for the attachment of a male F connector thereto. The insertion cap is a tubular member having a generally cylindrical outer surface slidingly disposed within the axial bore of the elastic sealing member. The insertion cap has an axial bore having an axial bore diameter that is substantially equal to the shaft diameter.

The features of the invention believed to be novel are set forth with particularity in the appended claims. However the invention itself, both as to organization and method of operation, together with further objects and advantages thereof may be best understood by reference to the following description taken in conjunction with the accompanying drawings.

DESCRIPTION OF THE PREFERRED EMBODIMENTS

Figure 1:
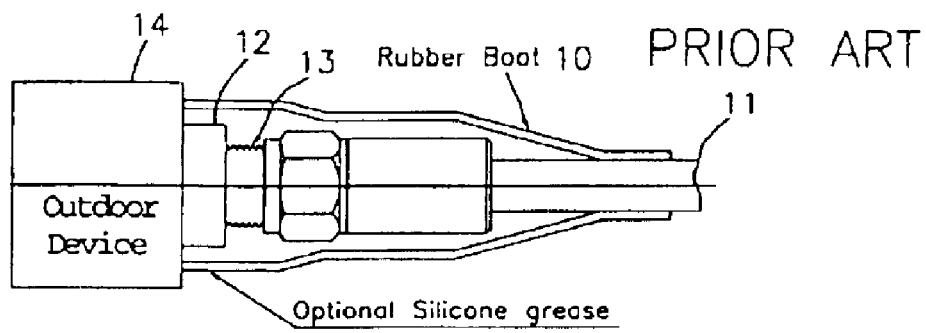
FIG. 1 is a plan view of a rubber boot employed to provide a moisture seal between a coaxial cable and a female F connector in accordance with the prior art.
Figure 2:
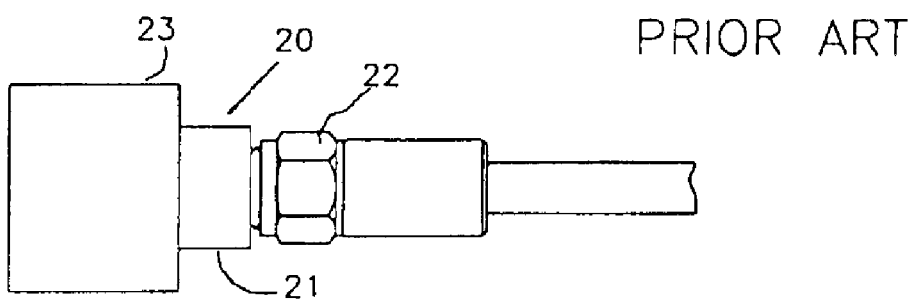
FIG. 2 is a plan view of an axial compression port seal employed to provide a moisture seal between a coaxial cable and a female F connector prior to tightening the nut on the shaft in accordance with the prior art.
Figure 3:
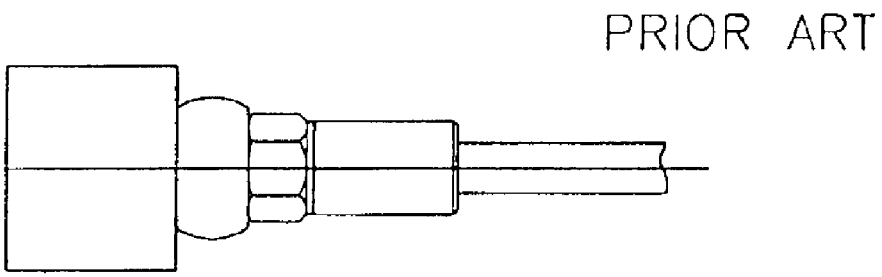
FIG. 3 is a plan view of the axial compression port seal of FIG. 2, employed to provide a moisture seal between a coaxial cable and a female F connector after the nut is tightened onto the shaft of the female F connector in accordance with the prior art.
Figure 4:
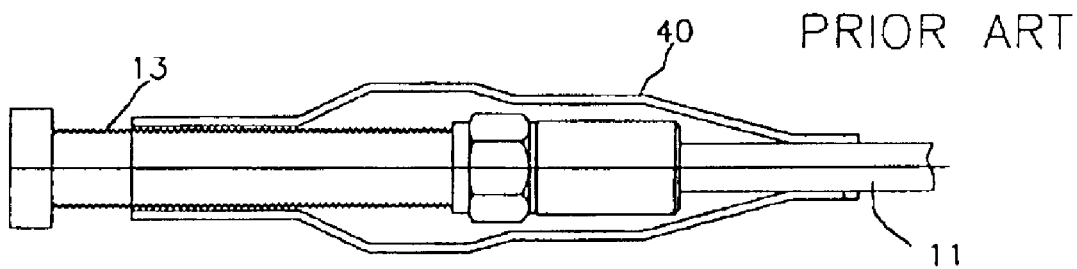
FIG. 4 is a plan view of a connector assembly wherein air shrink tubing is employed to provide a moisture seal between a coaxial cable and a female F connector in accordance with the prior art.
Figure 5:
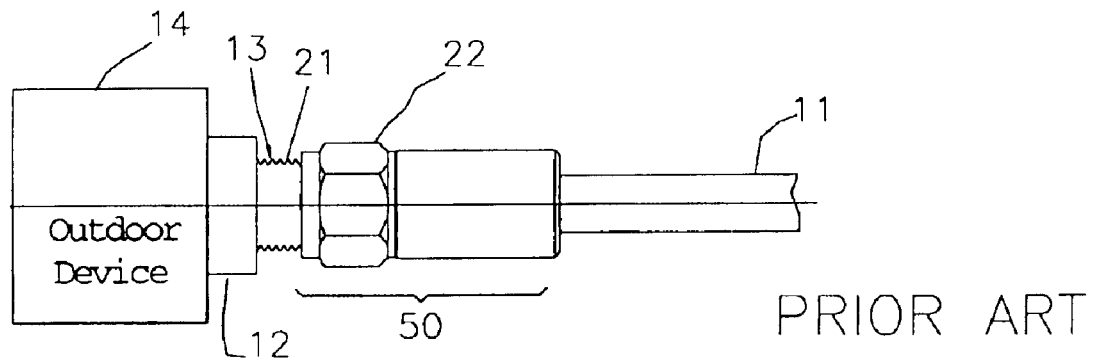
FIG. 5 is a plan view of a standard male F-Type coaxial cable connector attached to a female F-Type connector mounted on a device having a rubber boot ridge wherein there is no seal to prevent moist air from entering the cable via the interface between the nut on the male connector and the threaded shaft of the female connector.

Turning now to FIG. 5, a typical male-female F-Type connection of a coaxial cable to a device in accordance with the prior art is illustrated in elevational view. The device 14 may include a rubber boot ridge 12 mounted thereon that forms a resilient bulkhead around the periphery of a (typically) threaded shaft 21 on a female F connector 13, also mounted on the device 14. It should be noted that the inclusion of a rubber boot ridge on a particular device is optional, and many device manufacturers do not provide such a bulkhead. It is further noted that some female F connectors lack threads on the shaft, relying on a friction fit, or a bayonette-type connection between the male 50 and female 13 connectors to establish and maintain structural integrity of the connection. The male F connector 50 is attached to the end of a coaxial cable 11 in accordance with the current art and has a swivel nut 22 on a leading end thereof. An axial compression seal in accordance with the present invention is intended for use with male and female F connectors that engage by threaded means.

Figure 6:
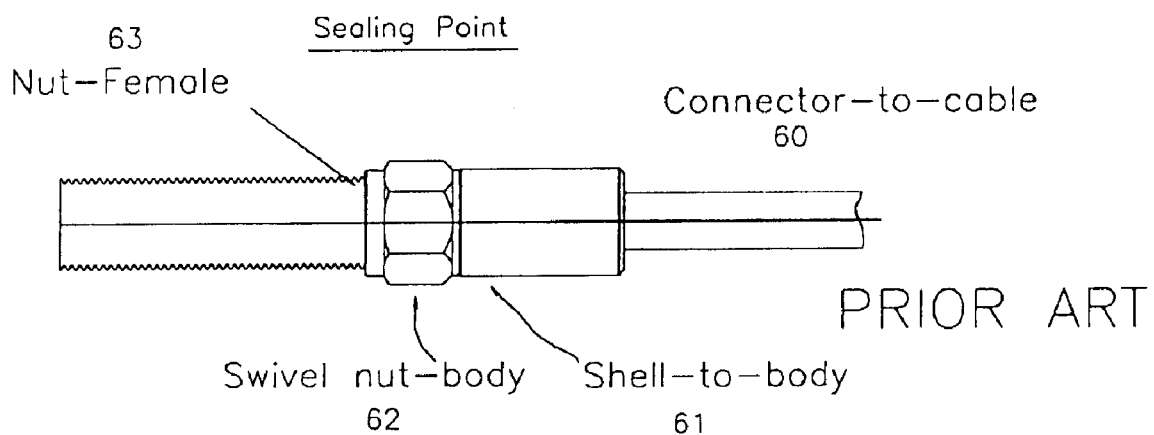
FIG. 6 is a plan view of a standard male F-Type coaxial cable connector attached to a threaded shaft on a female F-Type connector illustrating the locations where the assembly must be sealed in order to prevent moist air from entering the cable.

As stated above, there are four sites where moist air can enter a coaxial cable. FIG. 6 is a plan view of a standard male F-Type coaxial cable connector attached to a threaded shaft on a female F-Type connector illustrating the locations where the assembly must be sealed in order to prevent moist air from entering the cable. The points of moisture entry are the interface between: (a) the trailing end of the male connector and the cable, indicated at numeral 60; (b) the connector shell and the connector body, indicated at numeral 61; (c) the swivel nut and the connector body 62; and (d) the swivel nut and the F-Type female connector on the device being connected, indicated at numeral 63. The radial compression port of the present invention is for preventing leakage of moist air into the cable through interface 63.

Figures 7, 8, 9:
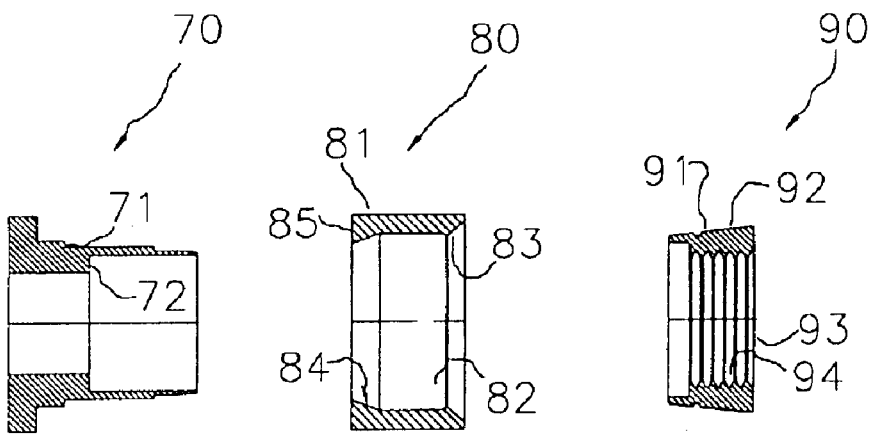
FIG. 7 is a longitudinal cross-sectional view of an insertion cap used to install a radial compression seal on the shaft of a female F connector in accordance with the present invention.
FIG. 8 is a longitudinal cross-sectional view of a compression ring used to provide radial compression of the elastic sealing member disposed on the shaft of a female F connector when the nut on the male connector is advanced against it in an axial direction.
FIG. 9 is a longitudinal cross-sectional view of an elastic sealing member which provides radial compression both inwardly against the shaft of the female F connector and outwardly against the compression ring when the nut on the male connector is advanced against the compression ring in an axial direction.

With reference now to FIGS. 7–10, a radial compression elastic seal suitable for providing a moisture seal at interface 63 is described in detail. The components of the radial compression seal are a nondeformable compression ring 80, illustrated in FIG. 8, and an elastic sealing member 90 shown in FIG. 9. An insertion cap 70 used for installing the seal on the shaft of a female F connector is shown in FIG. 7. FIG. 8 is a longitudinal cross-sectional view of a compression ring 80 used to provide radial compression of the elastic sealing member 90 disposed on the shaft of a female F connector when the nut 22 on the male connector 50 (FIG. 5) is advanced against it in an axial direction. The compression ring 80 is a ring comprised of a relatively nondeformable material,. Preferably plastic, having a generally smooth outer surface 81 and a generally cylindrical axial bore 82. The leading end of the axial bore has a circumferential annular ridge 83 therearound that releasably engages a mating annular groove 91 in the conical outer surface of the elastic sealing member 90. The trailing end 84 of the axial bore 82 is conical to provide radial compression of the elastic sealing member 90 when the compression ring 80 is advanced over the conical outer surface 92 of the elastic sealing member 90.

FIG. 9 is a longitudinal cross-sectional view of an elastic sealing member 90 which, in combination with the compression ring 80, provides radial compression both inwardly against the shaft of the female F connector and outwardly against the compression ring 80 when the nut 22 on the male connector 50 is advanced against the compression ring 80 along the shaft 21 (FIG. 5) of the female F connector in an axial direction. The elastic sealing member 90 is a ring comprised of an elastically deformable material and having a conical outer surface 92 and an axial bore 93. The inner diameter of the axial bore 93 is substantially equal to the outer diameter of the shaft of a female F connector and is preferably molded to include threads 94 on the wall of the axial bore 93 that mate with the course ⅜-32 thread on the outer surface of the F connector shaft.

FIG. 8 is a longitudinal cross-sectional view of a compression ring used to provide radial compression of the elastic sealing member 90 disposed on the shaft of a female F connector when the nut on the male connector is advanced against it in an axial direction. The leading end of the axial bore 82 has an annular ridge 83 circumferentially disposed thereon that matingly engages the annular groove 91 on the outer surface of the elastic sealing member 90. The leading end of the compression ring 80 is inserted over the trailing end of the elastic sealing member such that the ridge 83 and the groove 91 engage, then the ring and sealing member are fitted over the shaft of a female F connector. The advancement of the ring and sealing member is impeded by friction between the sealing member and the shaft. To overcome the friction and ensure correct positioning of the compression ring and sealing member on the shaft of the F connector prior to the attachment of a male F connector thereto, an insertion cap 70 is inserted through the axial bore of both the sealing member and the compression ring. The insertion cap 70 has an outer shoulder 71 on the outer cylindrical surface thereof that abuts the trailing end 85 of the compression ring and an inner shoulder 72 that abuts the trailing end of the shaft of the female F connector, positioning the sealing member and compression ring correctly on the shaft with sufficient thread exposed on the trailing end of the shaft to permit the nut on the male connector to engage the threads on the shaft and for the conductive pin in the male connector to fully enter and engage the female receptacle housed within the shaft of the female F connector.

Figure 10:
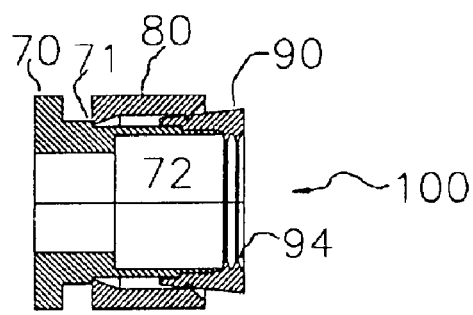
FIG. 10 is a longitudinal cross-sectional view of a compression sealing assembly in accordance with the present invention comprising a compression ring, an elastic sealing member and an insertion cap prior to installing the seal on the shaft of a female F connector.
Figure 11:
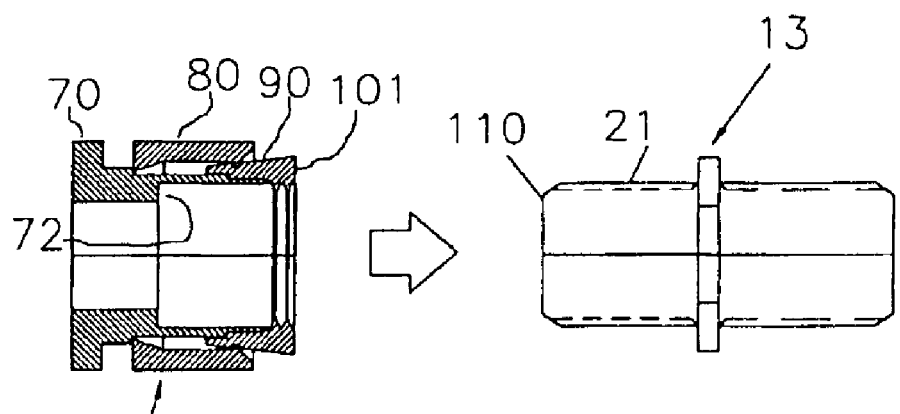
FIGS. 11–13 illustrate, in longitudinal cross-sectional view, the installation of a radial compression seal on the shaft of a female F connector in preparation for the attachment of a male F connector to the shaft.
Figure 12:
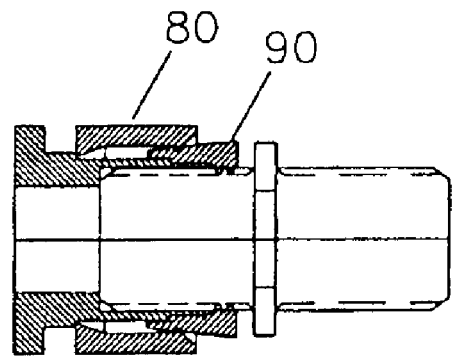
Figure 13:
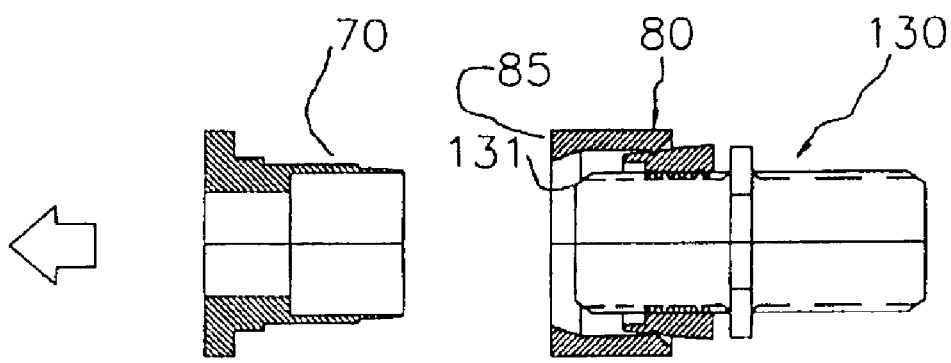

FIG. 10 is a longitudinal cross-sectional view of a compression sealing assembly 100, the assembly 100 prepared to install the radial compression seal comprising the elastic sealing member and compression ring on the shaft of a female F connector in accordance with the present invention. The assembly 100 comprises a compression ring 80, an elastic sealing member 90 and an insertion cap 70. FIG. 11 is a longitudinal cross-sectional view of the assembly 100 and a female F connector prior to installation of the radial seal on the shaft. The leading end 101 of the assembly is advanced over the trailing end 110 of the shaft 21 of the female F connector 13 until the inner shoulder 72 of the insertion cap 70 abuts the trailing end 110 of the female F connector as shown in FIG. 12. The insertion cap 70 is then removed as shown in FIG. 13 to provide a female F connector having an axial compressible seal disposed on the shaft thereof as shown at 130. When the insertion cap 70 is removed, threads 131 on the trailing end of the shaft are exposed to receive a threaded nut, and the trailing end 85 of the compression ring is disposed to abut the leading edge of a nut screwed onto the shaft. As the nut on the male F connector is tightened on the shaft of the female F connector, the nut forces the compression ring to move in an axial direction (to the right in FIG. 13) to compress the conical outer surface of the elastic sealing member 90, forcing the elastic material radially inwardly to seal the threads on the shaft against moisture entry.

In summary, the present invention describes a universal radial compression elastic seal that is radially compressed by the axial force of the leading end (front) of the male F nut being screwed onto the female threaded shaft of the female F connector. The axial force on the compression ring results in an inward (and outward) radial force that compresses the elastic sealing member along the shaft of the F female connector resulting in a pressurized moisture ingress barrier. The elastic sealing member preferably has internal ⅜-32 threads to mate with threads on the shaft for greater sealing. The radial compression seal of the present invention differs from other sealing devices and methods in that it does not rely upon a bulkhead being present on the female device adjacent to the female F connector, and it does not require an exposed length of un-threaded shaft to insure sealing. The axial compression seal provides a seal between the nut on the male F connector and the F female connector shaft with or without the presence of threads on the shaft. Sealing is accomplished by the front end of the invention's elastic sealing member sealing against the inner front lip of the male connector with an axial force, and the inward axial force of the invention's elastic member against the female shaft seals the other side. The axial force of the nut against the outer compression ring produces the inward radial force on the elastic member. The invention takes advantage of the universality of the F male hex nut O.D. dimension as an industry and product standard to provide a moisture seal between the male nut and any threaded female F connector shaft.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A radial compression seal for an F-type coaxial cable connector operable for preventing moisture from entering an interface between a threaded nut on a male F connector and a threaded shaft on a female F connector, the threaded shaft having a leading end, a trailing end and a shaft length therebetween and a shaft diameter, the the radial compression seal comprising:

(a) an elastic sealing member comprising a tubular ring of an elastically compressible material having a conical outer surface tapering outwardly from a leading end thereof to a trailing end thereof, and an axial bore having a bore diameter substantially equal to said shaft diameter; and (b) an inelastic compression ring having a cylindrical axial bore in a leading end thereof and a conical bore in a trailing end thereof, said conical bore tapering outwardly toward said leading end of said compression ring, said compression ring being slidingly mounted over said trailing end of said conical outer surface of said elastic sealing member; wherein when said elastic sealing member is disposed on said leading end of said shaft and said compression ring is forced to move in an axial direction toward said trailing end of said shaft, said compression ring compresses said elastic sealing member radially inwardly against said shaft wherein said elastic sealing member further comprises an annular groove adjacent said trailing end of said conical outer surface, and said compression ring further comprises an annular ridge adjacent said leading end of said axial bore, and wherein said annular ridge matingly engages said annular groove when said leading end of said compression ring is advanced over said trailing end of said elastic sealing member.

2. The radial compression seal of claim 1 wherein said cylindrical axial bore of said elastic sealing member is threaded.

3. The radial compression seal of claim 2 wherein said cylindrical axial bore of said elastic sealing member is threaded.

4. The radial compression seal of claim 3 further comprising an insertion cap, said insertion cap comprising a tubular member having a generally cylindrical outer surface slidingly disposed within said axial bore of said elastic sealing member and an axial bore having an axial bore diameter that is substantially equal to said shaft diameter.

* * * * *